US009990038B2

(12) United States Patent
Ramsay et al.

(10) Patent No.: US 9,990,038 B2
(45) Date of Patent: *Jun. 5, 2018

(54) CUSTOMIZING HAPTIC EFFECTS ON AN END USER DEVICE

(71) Applicant: Immersion Corporation, San Jose, CA (US)

(72) Inventors: Erin B. Ramsay, Montreal (CA); Robert W. Heubel, San Leandro, CA (US); Jason D. Fleming, San Jose, CA (US); Stephen D. Rank, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/097,599

(22) Filed: Dec. 5, 2013

(65) Prior Publication Data
US 2014/0089792 A1 Mar. 27, 2014

Related U.S. Application Data

(63) Continuation of application No. 12/060,324, filed on Apr. 1, 2008, now Pat. No. 8,621,348.
(Continued)

(51) Int. Cl.
G06F 3/0481 (2013.01)
G06F 3/01 (2006.01)
(Continued)

(52) U.S. Cl.
CPC ............ *G06F 3/016* (2013.01); *G06F 1/1626* (2013.01); *G06F 3/0488* (2013.01);
(Continued)

(58) Field of Classification Search
CPC ...... G06F 3/016; G06F 3/0481; G06F 3/0488; G06F 3/04886; G06F 9/4445; G09B 21/001; G09B 21/008
(Continued)

(56) References Cited

U.S. PATENT DOCUMENTS 5,857,986 A 1/1999 Moriyasu
6,653,930 B1 11/2003 Bonomo
(Continued)

FOREIGN PATENT DOCUMENTS

EP 1260949 A1 11/2002
EP 1276037 A2 1/2003
(Continued)

OTHER PUBLICATIONS

Non-Final Office Action issued in U.S. Appl. No. 14/190,562, dated Jul. 13, 2017.
(Continued)

*Primary Examiner* — Steven Sax
*Assistant Examiner* — Le Nguyen
(74) *Attorney, Agent, or Firm* — Medler Ferro Woodhouse & Mills PLLC

(57) ABSTRACT

Systems, methods, and associated software are described herein for enabling a regular user of an end user device, such as a cellular telephone, to customize parameters associated with haptic effects applied to the user by the end user device. In one implementation, among several, a method described herein includes enabling a user of an end user device to access software adapted to design or modify haptic effects of the end user device. The method further includes enabling the user to open a haptic track file and enter or modify parameters associated with the haptic effects of the opened haptic track file.

20 Claims, 5 Drawing Sheets

Related U.S. Application Data

(60) Provisional application No. 60/940,227, filed on May 25, 2007.

(51) Int. Cl.
    *G06F 1/16*         (2006.01)
    *H04M 1/725*      (2006.01)
    *H04M 19/04*      (2006.01)
    *G06F 3/0488*     (2013.01)
    *G06F 3/00*        (2006.01)

(52) U.S. Cl.
    CPC ....... *H04M 1/72563* (2013.01); *H04M 19/04* (2013.01); *G06F 3/002* (2013.01); *G06F 3/01* (2013.01); *H04M 19/047* (2013.01)

(58) Field of Classification Search
    USPC .......................................... 715/702, 864–865
    See application file for complete search history.

(56) References Cited

U.S. PATENT DOCUMENTS

| | | |
|---|---|---|
| 7,082,578 B1 | 7/2006 | Fishkin et al. |
| 7,663,604 B2 | 2/2010 | Maruyama et al. |
| 7,701,438 B2* | 4/2010 | Chang et al. .................. 345/156 |
| 7,801,569 B1* | 9/2010 | Zellner ............... H04M 19/041 455/170.1 |
| 2002/0177471 A1* | 11/2002 | Kaaresoja ................ G08B 6/00 455/567 |
| 2005/0064913 A1 | 3/2005 | Kim |
| 2005/0282590 A1 | 12/2005 | Haparnas |
| 2006/0028951 A1 | 2/2006 | Tozun et al. |
| 2006/0119573 A1* | 6/2006 | Grant .................... B06B 1/0215 345/156 |
| 2006/0147002 A1 | 7/2006 | Desai |
| 2006/0248183 A1 | 11/2006 | Barton |
| 2006/0277467 A1 | 12/2006 | Reopen et al. |
| 2007/0014280 A1 | 1/2007 | Cormier |
| 2007/0121914 A1 | 5/2007 | Pearson et al. |
| 2007/0133770 A1 | 6/2007 | LaPierre et al. |
| 2007/0176742 A1 | 8/2007 | Hofmann |
| 2007/0192067 A1 | 8/2007 | Wong et al. |
| 2007/0264978 A1 | 11/2007 | Stoops |
| 2007/0294177 A1* | 12/2007 | Volk et al. ....................... 705/52 |
| 2008/0059578 A1* | 3/2008 | Albertson ............... G06F 3/016 709/204 |
| 2008/0088602 A1 | 4/2008 | Kruse et al. |
| 2008/0153554 A1 | 6/2008 | Yoon |
| 2008/0188268 A1* | 8/2008 | Kim et al. .................... 455/566 |
| 2008/0204266 A1* | 8/2008 | Malmberg ............... G06F 3/016 340/683 |
| 2008/0254824 A1* | 10/2008 | Moraes ...................... 455/556.1 |
| 2008/0297475 A1 | 12/2008 | Woolf |
| 2009/0002218 A1 | 1/2009 | Rigazio et al. |
| 2009/0096746 A1 | 4/2009 | Hotelling |
| 2009/0132075 A1 | 5/2009 | Barry |
| 2011/0191674 A1 | 8/2011 | Rawley et al. |

FOREIGN PATENT DOCUMENTS

| | | |
|---|---|---|
| EP | 1401185 A1 | 3/2004 |
| GB | 2350698 A | 6/2000 |
| JP | 200611-154993 A | 6/1999 |
| JP | 2003290717 A | 10/2003 |
| JP | 2005065264 A | 3/2005 |
| JP | 2006-163579 | 6/2006 |
| JP | 2007013837 A | 1/2007 |
| JP | 2007042004 A | 2/2007 |
| WO | 2004053830 A1 | 6/2004 |
| WO | 2005085981 A1 | 9/2005 |
| WO | 2006019389 A2 | 2/2006 |
| WO | 2008042745 A2 | 4/2008 |

OTHER PUBLICATIONS

Non-Final Office Action issued in U.S. Appl. No. 14/190,562, dated Oct. 6, 2016.

\* cited by examiner

CUSTOMIZING HAPTIC EFFECTS ON AN END USER DEVICE

CROSS-REFERENCE TO RELATED APPLICATIONS

This application is a continuation of U.S. application Ser. No. 12/060,324, filed Apr. 1, 2008, now U.S. Pat. No. 8,621,348, which claims the benefit of U.S. Provisional Application No. 60/940,227, filed May 25, 2007. The entire disclosure of each of the applications is hereby incorporated by reference.

FIELD

The present disclosure generally relates to devices having haptic feedback capabilities for providing haptic effects to a user. More particularly, the present disclosure relates to enabling a user to customize the haptic effects on an end user device.

BACKGROUND INFORMATION

Electronic device manufacturers strive to produce a rich interface for users. Conventional electronic devices typically use auditory and visual cues to provide feedback to a user. For example, cell phones are commonly equipped with auditory and visual output devices for indicating an incoming telephone call. The auditory cues, for instance, may include a series of tones, synthesized music, or digitally-recorded music. However, in some instances, auditory and visual cues may not be useful to a cell phone user. For example, in a movie theater, a user will typically have the phone's audible ringer silenced and will have the phone in a place where visual cues cannot be seen. In this case, kinesthetic and/or tactile feedback can provide a more desirable and more effective interface.

Some electronic devices are equipped to provide kinesthetic feedback (such as active and resistive force feedback) and/or tactile feedback (such as vibration, vibrotactile feedback, texture, heat, etc.) to a user. Generally, these types of feedback are collectively known as "haptic feedback". Haptic feedback can provide cues that enhance and simplify the user interface. Specifically, haptic effects may be useful to alert the user to specific events or to provide realistic feedback to create greater sensory immersion within a simulated or virtual environment. However, further improvements in the field of haptics can still be made to enhance the user interface of end user devices.

SUMMARY

The present disclosure describes systems and methods for allowing a user of an end user device to modify parameters associated with haptic effects that can be played on the end user device. Among several possible embodiments, a method disclosed herein comprises enabling a user of an end user device to access software adapted to design or modify haptic effects of the end user device. The method further includes enabling the user to open a haptic track file and enter or modify parameters associated with the haptic effects of the opened haptic track file.

Other features, advantages, and implementations of the present disclosure, not expressly disclosed herein, will be apparent to one of ordinary skill in the art upon examination of the following detailed description and accompanying drawings. It is intended that such implied features, advantages, and implementations of the present disclosure be included herein.

BRIEF DESCRIPTION OF THE DRAWINGS

The components in the following figures are not necessarily drawn to scale. Instead, emphasis is placed upon clearly illustrating the general principles of the present disclosure. Reference characters designating corresponding components are repeated as necessary throughout the figures for the sake of consistency and clarity.

DETAILED DESCRIPTION

Figure 1:
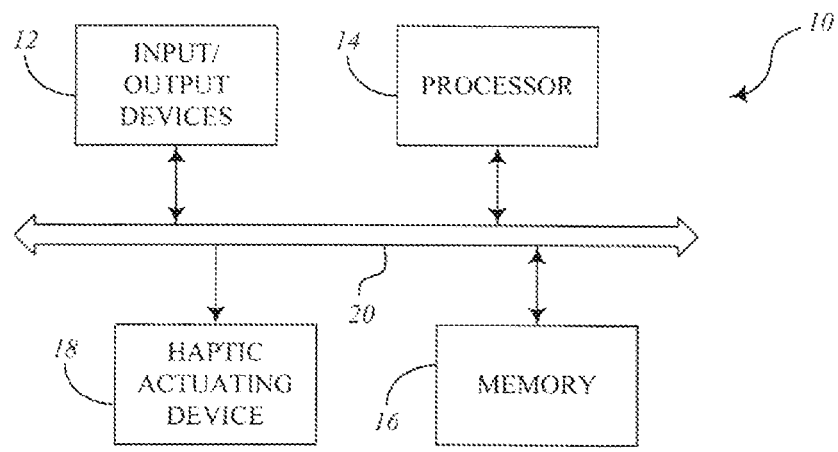
FIG. 1 is a block diagram illustrating an end user device according to one embodiment.

Some electronic devices are equipped with a haptic actuating device to provide haptic feedback to a user. This haptic feedback can be used to supplement auditory and visual feedback to enhance how information is provided to the user. For years, users of electronic devices have been given the option to modify various characteristics of auditory and visual outputs. For example, cell phone users can easily change ring tones if desired. However, a user typically does not have the option on the device itself to modify characteristics of haptic feedback. Normally, a professional haptics designer uses a computer system to create haptic effects or haptic tracks having parameters which are permanently set in the device during the manufacturing stage. The end user normally does not have the means to create or modify the haptic effect files directly on the device after the device is purchased.

However, in the present disclosure, systems and methods are described that allow a user to create and/or modify the parameters associated with haptic feedback on the target device itself through on-device means. In this respect, the power to create customized haptic effects is placed in the hands of a regular end user who may not be as skilled as a professional haptics designer. The end user can then create or modify the haptic effects to the user's liking using tools similar to those available to a professional haptic designer, but perhaps on a simplified scale. Software and systems can be embedded in the end user devices, according to the teachings herein, to lead a user through the process of entering and/or modify parameters and characteristics of haptic tracks.

With the ability to modify haptic tracks, a user can customize haptic effects to be associated with specific "events." For example, with respect to cell phones, a user may wish to associate certain customized haptic effects with receiving a call from a particular caller or group of callers. Also, a user may wish to customize certain haptic effects to play during the output of specific auditory and/or visual cues. Other events associated with an end user device may include, for example, the pressing of a key on a keypad, a time-sensitive message or alarm, receiving a phone call, receiving an e-mail, etc.

Furthermore, the customized haptic effects created by a user can be stored on the device for use by the user. Once saved, customized haptic effects can also be shared with others by transmitting the haptics files to another device. In this respect, other users can play the haptic effects on these other devices as desired. Customized haptic effects can also be transmitted to another device to initiate immediate playback of a haptic track on the receiving device. In this example, customized sensations can be applied to intended recipients when they receive (or make) calls from (or to) the author of the customized haptic effects. This would be the haptic equivalent of the audio feature known as "ringback tones" and "ringtones," whereby a telephone caller and receiver, respectively, hear a specific song or message instead of the standard ringing.

Although many examples described in the present disclosure relate to cell phones, it should be understood that the teachings of the present disclosure may also include other applications in which haptic effects can be applied to a user of an end user device. Other advantages will become apparent to one of ordinary skill in the art from an understanding of the present disclosure.

FIG. 1 is a block diagram of an embodiment of an end user device 10. At least part of end user device 10 includes regular electrical circuitry for performing tasks associated with the normal operation of end user device 10. For example, end user device 10 may be a mobile handset, cell phone, personal digital assistant (PDA), personal navigation device, tablet PC, hand-held video gaming device, game module, game console, touch screen, touch pad, virtual reality force feedback device (e.g., virtual reality haptic enabled force feedback garments such as a shirt, shoes, or glove), or other suitable electronic device. In these examples, end user device 10 may include circuitry for performing the normal functions of these devices. The present disclosure, however, describes further components and related software of end user device 10 for allowing a user to modify haptic tracks according to the teachings herein.

In some embodiments, end user device 10 can be a haptic-enabled device that provides haptic feedback to the user during specific events. Regarding the aspect of providing haptic feedback, the user may be able to sense the haptic effects from the device when it is held in the user's hand, stored in a pocket of the user's clothing, stored in a purse, handbag, pouch, or other portable accessory, attached or clipped to the user's clothing, worn as an item of clothing, or held in any other suitable manner adjacent to or near the user. In this regard, end user device 10 can be in direct or indirect contact with at least a portion of the user's body in order that the user can experience the sensation of haptic effects provided by the device.

In addition to the regular circuitry and functionality of end user device 10, additional elements reside in or are associated with end user device 10, as described herein, to enable the user to create and/or modify haptic effects. The customized haptic effects can be played on end user device 10 itself, provided that end user device 10 is capable of providing haptic feedback, or can be played on a corresponding compatible device that is haptic-enabled.

End user device 10, according to the embodiment of FIG. 1, includes input/output devices 12, processor 14, memory 16, and haptic actuating device 18. End user device 10 further comprises a bus 20 or other suitable communication interface allowing input/output devices 12, processor 14, memory 16, and haptic actuating device 18 to communicate with each other. In some embodiments, end user device 10 may further include a transceiver, such as for use in a cell phone or other wireless communication device. Such a transceiver can be used for communication within a cell phone network or within a short range network, such as is associated with Bluetooth® compatible devices. In this case, newly created or modified haptic effects can be transmitted to a device that has the capability to play the haptic effects. If end user device 10 is connected to another device via a mobile phone network, wide area network (WAN), local area network (LAN), Bluetooth® transmission, infrared transmission, etc., haptic files can be transmitted to these devices. In some embodiments, for instance, end user device 10 may use a streaming data transmission protocol for immediate playback on another user's device. When in a streaming mode, end user device 10 may stream music, video, and/or haptic data to other devices for an indefinite length of time.

In one embodiment, some elements shown in FIG. 1 can be positioned on different devices. For example, input/output devices 12, processor 14, and memory 16 can be used to allow a user to create or modify haptic effects. The created or modified haptic effects can be provided to or transmitted in any suitable manner to another device having haptic actuating device 18. In this case, the one device creates or modifies the haptic effects while the other device contains the haptic actuating device 18 to be able to play the haptic effects for the user of the other device.

Input/output devices 12 consist of one or more input mechanisms, which may include any suitable combination of keyboards, keypads, cursor control devices, computer mice, voice activation mechanisms, touch screen with respective stylus or other drafting instrument, touch pads, buttons, sliders, microphones, digital cameras, etc. Input/output devices 12 also consist of one or more output mechanisms, which may include any suitable combination of computer monitors, display screens (such as touch screens), virtual reality display devices, speakers or other audio output devices, printers, etc. Some input/output devices 12 may be capable of functioning to both receive inputs and provide outputs.

Processor 14 may be a general-purpose or specific-purpose processor or microcontroller. Generally, processor 14 controls the functions of end user device 10 and can execute software stored in memory 16. Memory 16 may include internally fixed storage and/or removable storage media for storing information, data, and/or instructions. Memory 16 may include any suitable combination of volatile memory, such as random access memory (RAM), dynamic RAM (DRAM), etc., and/or non-volatile memory, such as read only memory (ROM), electrically erasable programmable ROM (EEPROM), flash memory, etc. Memory 16 can also store a software program for enabling an end user to create and/or modify haptic effects, the software program of which can be executed by processor 14.

Haptic actuating device 18 may include any suitable combination of electrical or electro-mechanical components for providing haptic effects to a user. In some embodiments, haptic actuating device 18 is configured as an eccentric rotating mass (ERM) actuator. Modifying the amplitude values applied to an ERM actuator results in a change of the speed of a motor associated with the ERM actuator. In other embodiments, haptic actuating device 18 can be configured as a linear resonant actuator (LRA), whereby modifying the amplitude values applied to the LRA results in a change of vibration or pulse frequency. In still other embodiments, haptic actuating device 18 can be configured within a pressure sensing surface, such as a touch screen device, which is capable of sensing pressure applied by the user and also providing haptic feedback to the user. The pressure that is sensed by the pressure sensing surface can be translated into data related to amplitude parameters of a haptic effect as it is being modified. Regarding embodiments where haptic actuating device 18 is an accelerometer, the accelerometer can also be utilized as an input device for detecting gestures, shaking motions or tapping motions from a user to record a certain vibration entry. The vibration entry can be used as content for authoring haptic effects.

Figure 2:
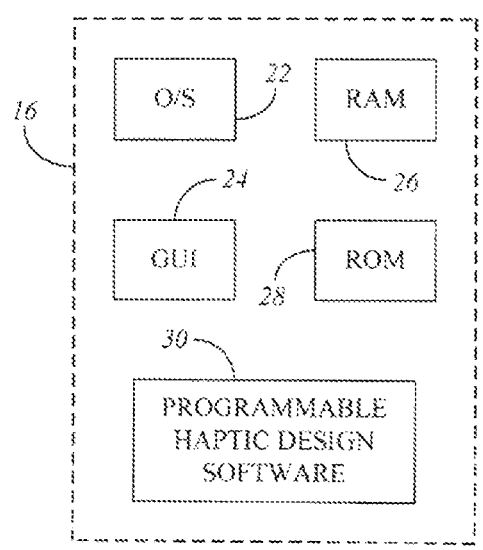
FIG. 2 is a block diagram illustrating the memory shown in FIG. 1 according to one embodiment

FIG. 2 is a block diagram of one embodiment of memory 16, which is shown in general in FIG. 1. Memory 16 in this implementation is configured to store programs, data, information, files, etc., including, for example, an operating system (O/S) 22, a graphical user interface (GUI) 24, RAM 26 or other suitable volatile memory, and ROM 28 or other suitable non-volatile memory, such as EEPROM, flash memory, etc. Files associated with haptic effects and that are stored in memory 16 can include a particular file format that is compatible with or can be understood by haptic actuating device 18 or other haptic actuating devices.

ROM 28 may be configured to store a library of preset haptic tracks that can be used as a general starting point for creating new tracks. In this case, the preset tracks can be protected from being overwritten in order to be available whenever the user wishes to create a new file. ROM 28 can also store haptic track files created or modified by the user and can also store mixed track files, which include multiple haptic tracks combined together. The user is given the capability to assign new filenames to newly created or modified haptic track files and mixed track files. ROM 28 can further store files that include association information for associating certain track files with specific events related to end user device 10.

As shown in FIG. 2, memory 16 also stores programmable haptic design software 30, which is configured to allow a user to create, modify, design, and customize haptic effects as desired. Using programmable haptic design software 30, a user can design a track or sequence of haptic outputs for playback over any length of time. Using programmable haptic design software 30, the user is also able to associate certain haptic track files and mixed track files with specific events related to end user device 10. For example, a haptic track can be programmed to play when one or more specific events occur, such as when an incoming cell phone call is received, or even when a call is received from a particular caller or phone number.

Certain parameters or characteristics of a haptic output or haptic track can be created, entered, changed, modified, etc. For example, the modifiable parameters may include a frequency of vibration and amplitude of vibration. Also, the frequency and amplitude can be set to change over time. In addition, the user is able to combine or mix different haptic tracks together if desired to provide a fuller haptic experience. In this way, a user is capable of programming or customizing a haptic track or track mix to one's liking.

While programming a haptic track or track mix, a user can enter a command to initiate a test playback of the haptic track or track mix in order that the user can experience upon demand how the creation may actually feel. This can be experienced, for example, using haptic actuating device 18 (FIG. 1) located in end user device 10. The user may also have the option to run the haptic track or track mix in the test playback in synchronization with audio and/or video outputs.

Programmable haptic design software 30 may be accessed by the user using any number of possible access techniques. In one example, the user may access programmable haptic design software 30 via GUI 24. In this case, programmable haptic design software 30 may be opened from a menu option such as "Options", "Tools", or "Tactile Sensations" from GUI 24. Other non-limiting techniques for accessing programmable haptic software 30 include a voice responsive system, a text interface, a Braille-type surface having either fixed or changeable components.

When initially accessed, programmable haptic design software 30 may present, via GUI 24, options to either "Create a New Track" or "Edit an Existing Track". The term "track" used in the present disclosure can refer to parameters associated with haptic effects that can be played on a haptic-enabled device. For instance, the parameters may include frequency and amplitude characteristics of a haptic output over a certain length of time.

According to one embodiment, when "Create a New Track" is selected, programmable haptic design software 30 may provide the user with two options to either "Start with Track from Library" or "Start from Scratch". As mentioned above, ROM 28 can store the library of tracks that can be used as a starting point for certain types of haptic effects. When "Start with Track from Library" is selected, a list of track files stored in the library are displayed for the user's selection. The track files in the library may be given filenames that represent understandable characteristics of the files. For the purpose of illustration, the files may be given names such as "Regular", "Normal Alarm", "Gentle", "Rising Intensity", "Long and Steady", "Quick Pulse", "Wake Up!", "Loud and Obnoxious", among others.

When a new file or existing file is opened, the user has the opportunity to modify certain characteristics of the haptic track as desired. For example, the user may be able to set the amplitude or frequency of vibration of the haptic track. It may be desirable for the user to vary the amplitude over time. The amplitude can be changed gradually or in steps during a portion of or during the entirety of the haptic track.

Another aspect of the haptic track that can be modified by the user is the attack level, which corresponds to the initial amplitude of the signal. Attack time is another modifiable parameter that corresponds to the time that it takes for the signal to change from the attack level to a center magnitude, which is another parameter that can be set. The center magnitude corresponds to the amplitude of the haptic signal during what may be the majority of the time of the haptic track. Another parameter is fade level, which corresponds to an amplitude at the end of the track. The time that it takes for the signal to change from the center magnitude to the fade level is referred to as fade time, which can also be modified. The user also can enter a certain duration, which is another modifiable parameter. In some embodiments, the signal remains at the center magnitude for a time equal to the duration minus the attack time and fade time. In other embodiments, the duration may be associated with the time that the signal remains at the center magnitude.

The following description includes several embodiments defining ways that the parameters of a haptic track can be modified. When the user accesses programmable haptic design software 30 via GUI 24 and opens a file to be edited, the user can continue to interact with programmable haptic design software 30 by input and output mechanisms of GUI 24.

In a first example, specific values related to parameters of the haptic track can be entered via GUI 24. Regarding parameters such as attack level, attack time, magnitude, duration, fade level, and fade time, the user can enter values in units of Hertz, seconds, milliseconds, decibels, etc. GUI 24 may present an acceptable range of values for each of the parameters. Also, programmable haptic design software 30 can monitor the entries to check for errors, which may be a result of setting values outside the acceptable range, conflicting values among two or more parameters, etc.

Another example of how to modify haptic tracks is by presenting via GUI 24 a range of values that can be selected by the user. Alternatively, in place of values, descriptive terms can be used that might be more easily understood by a non-skilled user. For example, some descriptive terms may include the categories of "Starting Intensity" (attack level), "Intermediate Intensity" (amplitude or magnitude), and "Ending Intensity" (fade level). Other descriptive terms may include "Duration" (duration), "Start Time" (attack time), and "Ending Time" (fade time). Under the categories of Starting Intensity and Ending Intensity, descriptive terms such as "Strong", "Medium", and "Weak" may be presented to the user for selecting the desired attack level. Under the category of Intermediate Intensity, descriptive terms such as "High", "Medium", and "Low" may be presented to the user for selecting the desired magnitude. Under the Duration category, "Long", "Medium", and "Short" may be presented to the user. Under the Start Time and Ending Time categories, "Rise/Fade Quickly", "Medium Rise/Fade", and "Rise/Fade Slowly" may be presented for selection of the desired rise or fade times. As suggested above, additional entry can be made to allow the user to alter the amplitude or pulse frequency during the haptic track. It should be understood that other descriptive terms can be used to describe in layman's terms the characteristics of a haptic track. Also, it should be understood that the categories can be divided in more than three values or levels of selection.

In another example of how parameters can be entered, GUI 24 can display a graph showing some of the characteristics of the amplitude of a haptic output over time. GUI 24 may further enable the user to alter the graph as the user desires. For example, lines of the graph can be stretched, shortened, moved, slid, altered, etc., using various input device tools. In this embodiment, the user may use manipulative input devices, such as a touch screen device and stylus.

Other visual presentations may be provided to the user to allow the user to modify parameters. For example, the amplitude of a haptic track can be represented by musical notes along a musical scale. Thus, musical notes higher on the scale can represent higher amplitude or higher pulse frequency haptic output. Other embodiments for representing amplitude using musical notation include musical directions with respect to loudness. For example, ff (fortissimo) might be used for very loud or very high amplitude, f (forte) might be used for loud or high amplitude, mf (mezzo forte) for moderately loud or moderately high amplitude, m (mezzo) for moderate, mp (mezzo piano) for moderately soft or moderately low amplitude, p (piano) for soft or low amplitude, and pp (pianissimo) for very soft or very low amplitude. Duration parameters in this respect can also be represented by musical notation. For instance, musical notes may be shown as eighth notes, quarter notes, half notes, etc., to represent the duration of a haptic output.

After creation or modification of a haptic track file or mixed track file, the user can store the file using a new filename or can overwrite the original file, provided that the original file is not protected from overwriting. Particularly, as mentioned above, the files in the library can be set so that they cannot be overwritten. ROM 28 is configured to store any reasonable number of haptic track files and mixed track files according to the particular design.

Various logical instructions or commands may be included in programmable haptic design software 30. Programmable haptic design software 30 of the present disclosure can be implemented in hardware, software, firmware, or a combination thereof. When implemented in software or firmware, the software can be stored in memory 16 and executed by processor 14. When implemented in hardware, programmable haptic design software 30 can be implemented, for example, using discrete logic circuitry, an application specific integrated circuit (ASIC), a programmable gate array (PGA), a field programmable gate array (FPGA), etc., or any combination thereof.

Figure 3:
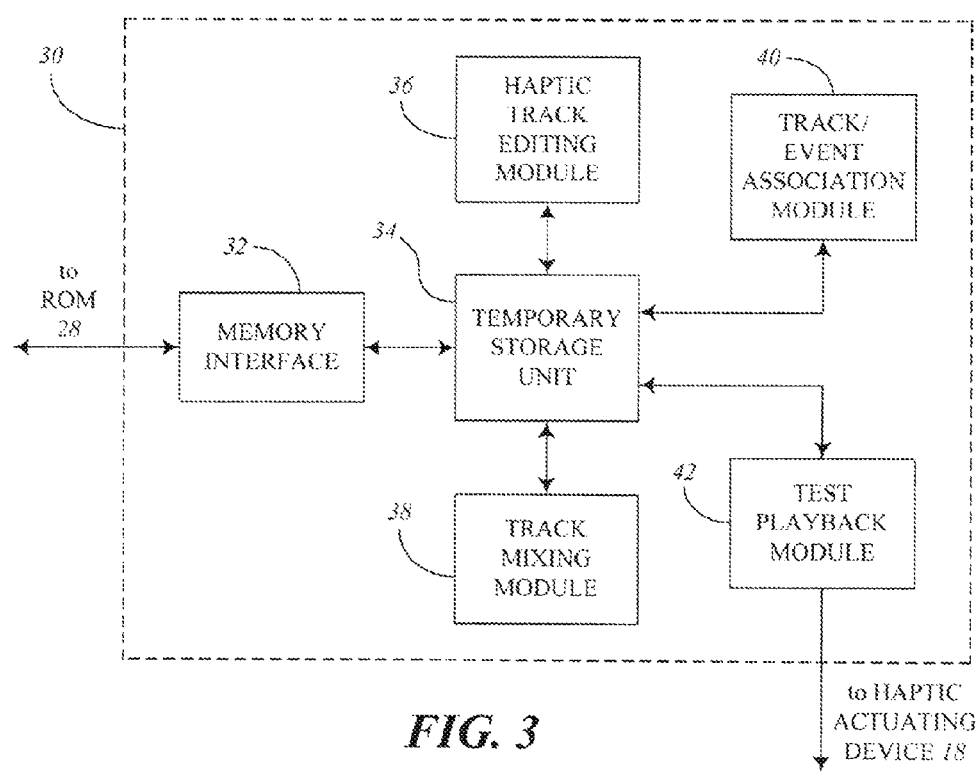
FIG. 3 is a block diagram of the programmable haptic design software shown in FIG. 2 according to one embodiment.

FIG. 3 is a block diagram of an embodiment of programmable haptic design software 30 shown in FIG. 2. In this embodiment, programmable haptic design software 30 includes a memory interface 32, temporary storage unit 34, haptic track editing module 36, track mixing module 38, track/event association module 40, and test playback module 42.

Memory interface 32 is configured to retrieve a copy of a file, either a haptic track file or a mixed track file, from ROM 28 (FIG. 2). Memory interface 32 places the copy of the retrieved file in temporary storage unit 34, where the file can be modified according to user's inputs. In this respect, temporary storage unit 34 can simply contain RAM or other volatile memory while the tracks are being programmed. After a user creates or modifies a file or files in temporary storage unit 34, memory interface 32 is configured to store a copy of the file in ROM 28 as instructed by the user. Also, the user may enter a unique filename for the file for later referencing and accessing the file. Furthermore, each file can include information that associates the file with one or more specific events that may occur during normal use of end user device 10.

While files are opened in the temporary storage unit 34, the user may use haptic track editing module 36 to edit the opened files. In addition, the user may use track mixing module 38 to mix a combination of opened haptic tracks together. Haptic track editing module 36 allows the user to perform different types of editing of the haptic track by changing various parameters of the haptic track. The haptic tracks can be modified in any suitable manner, such as the ways described above. For example, haptic track editing module 36 enables user to modify such features as the rise time, attack level, attack time, magnitude, duration, fade time, and other characteristics related to the waveform parameters with respect to time during which the haptic track is played. In addition, haptic track editing module 36 enables the user to enter one or more frequencies for the haptic track or even continually changing frequencies to be played along the length of the haptic track.

Temporary storage unit 34 is capable of storing more than one haptic track. Additionally, temporary storage unit 34 can even store multiple copies of the same haptic track, for example, if the user wishes to mix the same haptic track into a mixed track, such as where a second occurrence of the haptic track is offset in time from a first occurrence, in order to provide a fuller haptic output. Track mixing module 38 allows the user to combine haptic tracks to play simultaneously, to overlap in time for a portion of the time, to play end-to-end, or even to start a subsequent track after a short pause at the end of a first track. When programmed to overlap in time, two or more haptic tracks can be programmed to be simultaneous or partially overlapping in time in any desirable manner. Track mixing module 38 also allows the user to adjust the amplitude of one haptic track with respect to another to more strongly emphasize one track over another.

Track/event association module 40 allows the user to form a relationship or association between a specific event and a track file. One example of an event is receiving a cell phone call from a certain caller. When a call is received from the caller, the file having the association information added by track/event association module 40 is retrieved from memory and played along with respective audio and visual cues. Track/event association module 40 allows the user to form associations of any number of events with any number of track files. In some cases, one or more events may not be associated with a track file, while in other cases, each event may be associated with a respective track file. Other associations can be established, such as for relating haptic tracks and mixed tracks with other media or with specific auditory and/or visual output.

Test playback module 42 may reside in programmable haptic design software 30 as illustrated in FIG. 3. In other embodiments, this element may be omitted from the programmable haptic design software 30 depending on whether or not end user device 10 includes a haptic actuating device. If end user device 10 does include a haptic actuating device, test playback module 42 can be used to play a haptic track or mixed track that is temporarily stored in temporary storage unit 34. When the user enters a command to end user device 10 to provide a test playback, test playback module 42 sends a selected haptic track or mixed track from temporary storage unit 34 to haptic actuating device 18, which can then play the track for the user. Test playback module 42 may be useful to provide the user with an understanding of how modification affect how a haptic track or mixed track would actually feel when played out on haptic actuating device 18. In further implementations, test playback module 42 may be configured to playback a haptic track as changes are being made. In this case, the user may receive immediate feedback regarding how the changes affect the haptic tracks.

In other embodiments, such as where haptic actuating device 18 resides on a remote device, programmable haptic design software 30 may additionally include a transmitting module for sending an instruction to a transmitter or transceiver of end user device 10 to transmit a selected haptic track or mixed track to the remote device. Thus, a remote user can experience or test the track being modified.

Programmable haptic design software 30 may operate in conjunction with other measuring and testing devices associated with end user device 10. For example, a temperature measuring device may be used to detect if the temperature of end user device 10 drops below a certain level. If so, one or more haptic tracks being edited by programmable haptic design software 30 may be programmed to compensate for a situation that may result in a decreased ability on the part of the user to sense haptic feedback. Cold temperatures may result in cold hands that cannot sense vibrations as easily. Also, along with cold weather, a user may be more likely to wear extra clothing, gloves, mittens, etc., which can muffle the haptic feedback from end user device 10. Compensation in these situations may include a greater amplitude of the haptic signal, longer duration, and/or higher frequency vibrations.

Programmable haptic design software 30, described with respect to FIGS. 2 and 3, and other programs or software code stored in memory 16 that are associated with creating and modifying haptic effects, include executable logical instructions as described herein. Programmable haptic design software 30 can be embodied in any suitable computer-readable medium for execution by any suitable processing device. The computer-readable medium can include any physical medium that can store the programs or software code for a measurable length of time.

Figure 4:
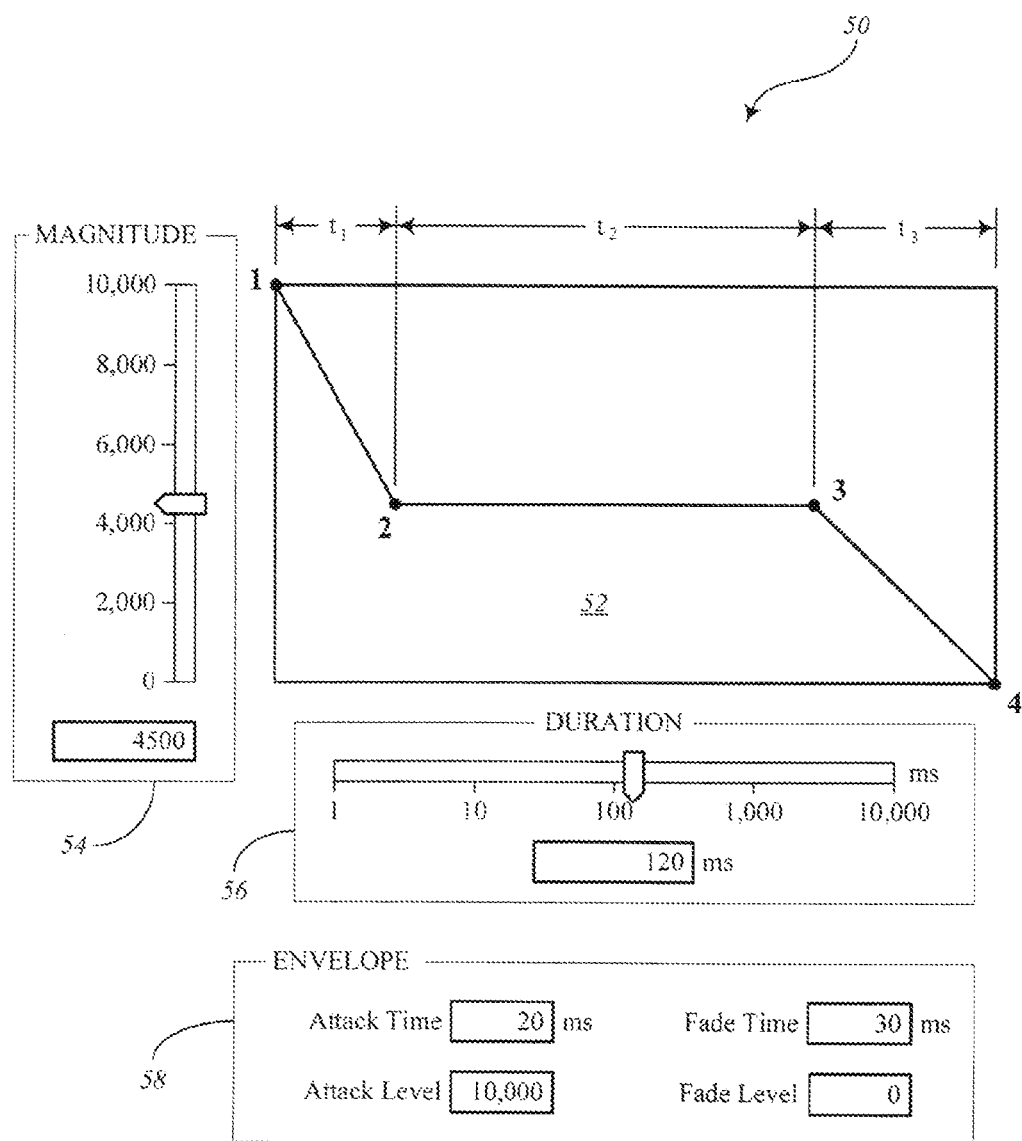
FIG. 4 is a graphical user interface associated with an end user device allowing changes to a haptic track according to one embodiment.

FIG. 4 is a diagram showing an embodiment of a graphical user interface (GUI) 50 associated with the end user device having haptic design capabilities. GUI 50 in this embodiment includes a screen 52 diagrammatically showing an output of a haptic track. In other embodiments, GUI 50 may show track mixes where two or more haptic tracks are combined together. GUI 50 also includes a magnitude adjusting mechanism 54, duration adjusting mechanism 56, and an envelope adjusting mechanism 58.

Screen 52, showing a single haptic track, includes four points that are numbered 1-4. Point 1 represents the attack level, shown in this example having a magnitude of 10,000, which corresponds to the attack level setting in the envelope adjusting mechanism 58. The center magnitude or intermediate magnitude is set at 4500 in this example. Screen 52 shows the center magnitude maintaining a steady magnitude from point 2 to point 3. The attack time is set at 20 ms, which is shown in screen 52 as $t_1$ representing the time from point 1 to point 2. In this example, fade level is set at 0 (point 4) and the fade time is set at 30 ms (from point 3 to point 4, or $t_3$). If desired, the names used to describe the characteristics or aspects of the haptic track can be changed to any suitable names. For example, "magnitude" may be called amplitude, intensity, volume, etc., and "duration" can alternatively be named periodicity, length, etc.

Magnitude adjusting mechanism 54 includes a slider that allows the user to adjust the center magnitude of the haptic track as desired. Magnitude adjusting mechanism 54 also includes a window in which a user can enter a value representing the magnitude. In this embodiment, the magnitude value is set at 4500, which can be seen on the slider and in the window. These and other suitable means can be used to adjust magnitude.

Duration adjusting mechanism 56 includes a slider that allows the user to adjust the duration of the haptic track as desired. GUI 50 shows the duration slider being represented on a logarithmic scale, but in other embodiments may include a linear scale. Duration adjusting mechanism 56 also includes a window in which a user can enter a duration value in milliseconds. In this embodiment, the duration can be adjusted to any time period between 1 ms and 10 seconds. However, in other embodiments, duration adjusting mechanism 56 may be configured to allow selection of any desirable value. The duration is set at 120 ms in this example, which can be seen on slider and in window.

Envelope adjusting mechanism 58 includes windows allowing the user to enter values for attack time, attack level, fade time, and fade level. In this example, the attack time is set at 20 ms, attack level is set at 10,000, fade time is set at 30 ms, and fade level is set at 0. With attack time ($t_1$) set at 20 ms, fade time ($t_3$) set at 30 ms, and duration set at 120 ms, the time $t_2$ that the signal remains at the center magnitude of 4500 is equal to the total duration time minus the attack time and fade time. Specifically, $t_2 = \text{duration} - t_1 - t_3$, and, in this case, $t_2$ would be 70 ms.

In FIG. 4, the parameters of the haptic track shown in screen 52 illustrates the amplitude or magnitude of the haptic track versus time, where the unit of time is illustrated on the x-axis and the unit of amplitude is illustrated on the y-axis of the graph. This graph may be illustrated on GUI 24 in embodiments where the user can manipulate the lines of the graph for modifying the haptic track. In other embodiments, certain representations or values describing the aspects of the haptic track can be stored in order to recreate haptic track 44 at a later time.

It should be understood that the particular graph of the haptic track shown on screen 52 merely represents one example of possible haptic outputs and is not intended to limit the disclosure in any way. In some embodiments, the attack time and attack level may be omitted, such that the user enters parameters with respect to magnitude, duration, fade time, and fade level. Still other embodiments may omit attack time and fade time, which can greatly simplify user interaction. Yet in other implementations, further characteristics or parameters may be included in haptic track 44 to allow tracks having even greater complexity. For instance, instead of one constant amplitude level for magnitude, the haptic track may include two or more levels. Furthermore, the haptic track may include additional attack level, attack time, fade level, and fade time characteristics between the illustrated attack and fade levels.

Figure 5A:
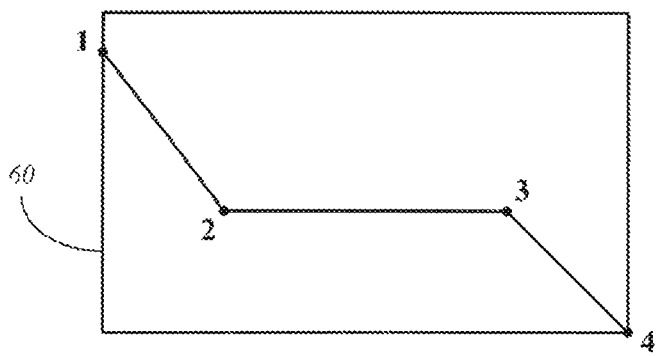
FIGS. 5A-5D are graphs illustrating a number of examples of possible haptic tracks that can be created using the graphical user interface of FIG. 4.

FIGS. 5A-5D are graphs representing embodiments of screen 52 shown in FIG. 4. Graph 60 of FIG. 5A represents a situation where a user enters an attack level (point 1) that is higher than the center magnitude (from point 2 to point 3). Also, the center magnitude in graph 60 is higher fade level (point 4). Graph 60 therefore provides an initially strong signal sloping down to a level portion and then sloping down again to the final fade level.

Figure 5B:
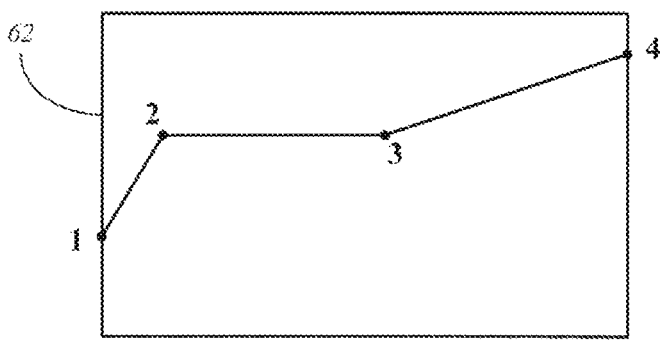
Figure 5C:
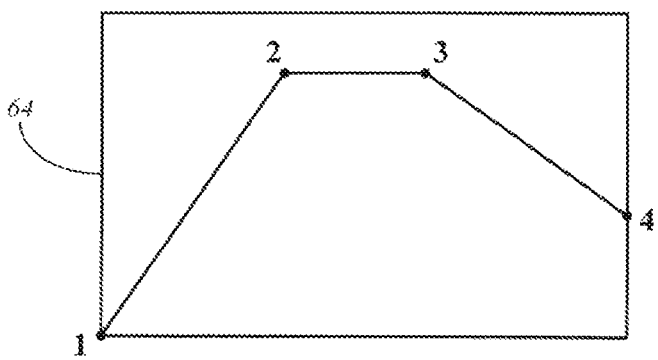
Figure 5D:
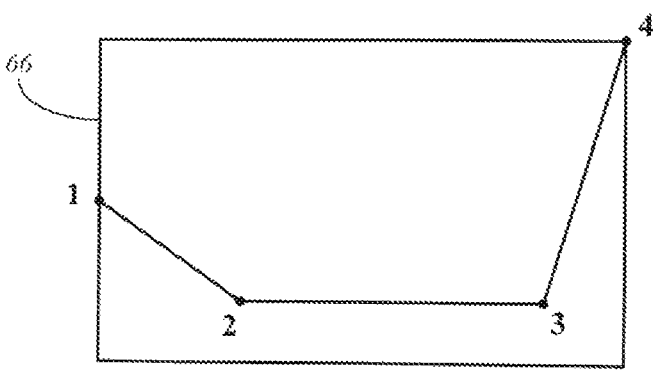

FIG. 5B shows graph 62 having an upward slope to the level off portion followed by another upward slope to the final fade level. In this case, the attack level is the lowest and the fade level is the highest. Graph 64 of FIG. 5C includes an upward slope to the level off, and then a downward slope. Graph 66 of FIG. 5D includes a downward slope to the level off, and then an upward slope. It should also be noted from FIGS. 5A-5D that the attack times, fade times, and durations include various non-limiting possibilities. It should further be noted that attack times and/or fade times can be 0 ms, such that the output will simply include the center magnitude. Further, if the attack time plus the fade time is equal to the duration, then the time of the center magnitude level will be 0 ms. Other possible arrangements using these parameters can be achieved as desired.

Figure 6:
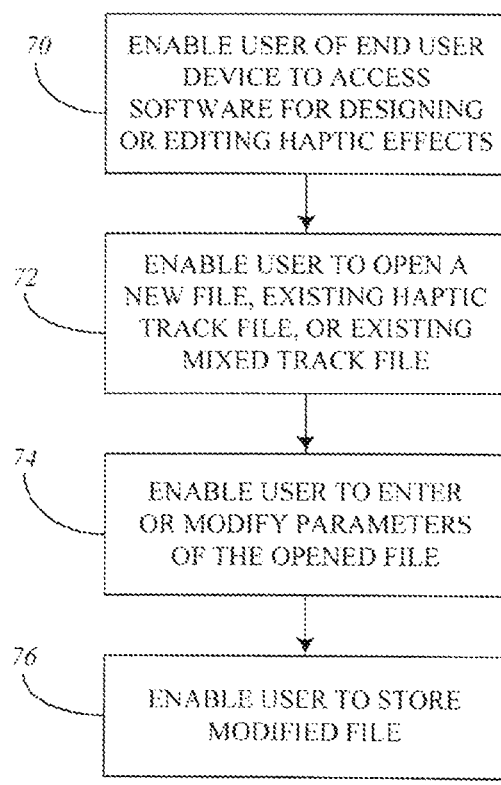
FIG. 6 is a flow chart illustrating operations provided by a haptic design program according to one embodiment.

FIG. 6 is a flow chart illustrating an embodiment of a method for enabling a user to edit and process haptic effects and haptic tracks. The method may include operations of a haptic design program, such as programmable haptic design software 30 or other programs for enabling the creation and/or modification of haptic tracks. Block 70 of the method describes that the user of the end user device is enabled by the program to access software for designing or editing haptic effects. The end user device may be haptic-enabled device, such as a handheld device or module. The software for designing or editing haptic effects may include programmable haptic design software 30 or other programs.

In block 72, the method enables the user to open a new file, an existing haptic track file, or an existing mixed track file. In these examples, a new file can represent a haptic track from a library having default values that can be used as guidelines or starting points for creating a new track file. Otherwise, the new file can be created with no particular guidelines if desired.

In block 74, the user is enabled to enter or modify parameters of the opened file. Entering or modifying parameters can be accomplished using any suitable interface between the user and the end user device. Entering values may correlate to actions for new haptic files, while modifying correlates to pre-existing haptic files or values of preset files. Values can be entered directly, selections of values can be made from a range of values, lines of a graph of a haptic track can be altered to change the shape of the track, etc.

In one embodiment, a new haptic file can be generated/authored or a haptic file can be modified using a number of different authoring tools. A graphical user interface can be used to generate content. Further, voice activated commands can incorporate descriptive words or beat-boxing. On-board accelerometers can generate content through gestures, shaking or tapping the device. Further, text based content can be used to author haptic files/effects.

In one embodiment, the design tool for creating haptic effects (e.g., haptic design software 30) is a rich, full fidelity haptic studio, allowing the creation of effects by creating/modifying characteristics such as magnitude, periodicity, attack time, attack level, fade time, fade level, wave shape, and negative braking. The tool can modify an existing haptic data file or create a new one or link multiple haptic files.

In one embodiment, haptics can be authored and tailored for use with emoticons and text messages. Such haptics can be personalized and private, such as a specific vibratory feel of a heart beat, a "warm & fuzzy" feel, a "screech", etc. In one embodiment, the authored haptics can be short haptic signatures, such as with a set of recognizable beats. These can be universally recognizable or culturally recognizable patterns or rhythms of sound converted to vibration. In addition, short patterns can be developed for a private application or personal use.

In block 76, the user is enabled to store the modified file. In some embodiments, the user can play back a created or modified haptic track or mixture of tracks to test how the tracks might actually feel. Furthermore, the user may be able to transmit the file of one or more haptic tracks or mixed tracks to another user on a different device. In this respect, the users can share haptic effect files.

In one embodiment, an association tool such as module 40 of FIG. 3 acts as a link between content generated with the authoring tool to events generating haptic feedback on the specific device. The association tool could provide a graphical user interface, be text based, or event driven, such as replicating the event and choosing a haptic effect to be associated with the event. The association tool could allow for different themes or settings to be applied based on user selection as well as providing the end user with the option to return to default effects.

For example, in one embodiment, an end user of a mobile phone uses a graphical user interface to design a haptic melody. The user saves this design file in a format that will be recognized by a haptic playback service/program. The user then associates an incoming call event with the newly authored set of effects.

In another embodiment, an end user of a gaming console creates a haptic effect through an authoring tool, making use of accelerometers on her controller to detect gestures, shaking, etc. The user then saves the pattern in a format that will be recognized by a haptic playback service/program. The user then associates this effect with being on the receiving end of a special punch in a boxing game. The user connects with a special punch while playing this boxing game over the game console's online community. The user on the receiving end of the special punch experiences the haptic effect authored by the original user.

In another example, the end user of a handheld device uses a spoken word authoring tool to define a vibration pattern, such as, for example by vocalizing "strong quick, strong quick, weak long". The user then transmits this haptic melody to a colleague. The user's colleague receives the haptic melody message.

In another example, the end user works with a haptic enabled touch screen point of sale system in an ice cream parlor. She finds that when she starts her shift she is haptically sensitive but as the shift progresses and her hands become colder she is not able to sense tactile feedback as easily. The end user creates a series of effects for the point of sale touch screen in varying strength. The end user then creates a series of themes named early, middle and late, with effects comprised of increasing strength from early to middle and middle to late in her shift. As the user's day progresses, her haptic profile changes to compensate for her decreased ability to sense a tactile sensation.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein merely represent examples of implementations and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claim.

What is claimed is:

1. An electronic handheld device comprising:
    a resonant haptic actuating device;
    a touch screen configured to sense pressing inputs at a surface of the touch screen and to display a graphical user interface (GUI) for representing at least one vibratory characteristics of a haptic effect;
    a memory storing software that enables the pressing inputs to define the haptic effect as a set of beats; and
    a processor configured, when executing the software stored in memory,
        to detect the pressing inputs at the surface of the touch screen for defining the set of beats of the haptic effect,
        to determine an amount of pressure that is received from the pressing inputs at the surface of the touch screen,
        to translate the pressing inputs into the vibratory characteristics of the haptic effect, wherein the one or more vibratory characteristics include a duration and a magnitude of the haptic effect, wherein the magnitude of the haptic effect is based on the amount of pressure that is received from the pressing inputs at the surface of the touch screen,
        to display the duration of the haptic effect via the GUI on the touch screen,
        to store, in a haptic effect file in the memory, the one or more vibratory characteristics of the haptic effect that are based on the pressing inputs,
    wherein the processor is further configured to cause the resonant haptic actuating device to play the set of beats of the haptic effect when an event associated with the haptic effect occurs, wherein the event is associated with receiving a communication, and
    wherein the haptic effect is a vibrotactile haptic effect on the electronic handheld device.

2. The electronic handheld device of claim 1, further comprising an accelerometer configured to detect tapping motions at the device.

3. The electronic handheld device of claim 1, wherein the processor is further configured to display the magnitude of the haptic effect via the GUI on the touch screen.

4. The electronic handheld device of claim 1, wherein the one or more vibratory characteristics of the haptic effect further comprise a frequency of the haptic effect.

5. The electronic handheld device of claim 1, wherein the electronic handheld device includes one of a mobile handset, cellular telephone, personal digital assistant, personal navigation device, or tablet PC.

6. The electronic handheld device of claim 1, wherein the memory is configured to store a library of haptic tracks that can be used as a starting point for creating haptic effects.

7. The electronic handheld device of claim 1, wherein the communication that is associated with the event is an e-mail.

8. A method of defining haptic effects on a mobile device comprising a resonant haptic actuating device and a touch screen configured to display a graphical user interface (GUI) for representing at least one vibratory characteristics of the haptic effects, the method comprising:
    detecting pressing inputs at a surface of the touch screen, the pressing inputs defining a haptic effect as a set of beats;
    determining an amount of pressure received from the pressing inputs at the surface of the touch screen;
    translating the pressing inputs to vibratory characteristics of the haptic effect, wherein the vibratory characteristics include a magnitude of the haptic effect and a duration of the haptic effect, wherein the magnitude of the haptic effect is based on the amount of pressure received from the pressing inputs at the surface of the touch screen;
    displaying the duration of the haptic effect via the GUI on the touch screen;
    storing the vibratory characteristics of the haptic effect on the mobile device; and
    causing the resonant haptic actuating device to play the set of beats of the haptic effect when an event associated with the haptic effect occurs, wherein the event is associated with receiving a communication,
    wherein the haptic effect is a vibrotactile haptic effect.

9. The method of claim 8, further comprising detecting, by an accelerometer of the mobile device, tapping motions at the mobile device.

10. The method of claim 8, further comprising displaying the magnitude of the haptic effect via the GUI on the touch screen.

11. The method of claim 8, wherein the one or more vibratory characteristics of the defined haptic effect further comprise a frequency of the haptic effect.

12. The method of claim 8, wherein the mobile device includes one of a mobile handset, cellular telephone, personal digital assistant, personal navigation device, or tablet PC.

13. The method of claim 8, further comprising storing a library of haptic tracks that can be used as a starting point for creating haptic effects.

14. The method of claim 8, wherein the communication that is associated with the event is an e-mail.

15. A non-transitory computer-readable medium having instructions stored thereon that, when executed by a processor, cause the processor to generate haptic effects on a mobile device that comprises an eccentric rotating mass (ERM) actuator and a touch screen configured to display a graphical user interface (GUI) for representing at least one vibratory characteristics of haptic effects, the instructions being configured to cause the processor to generate the haptic effects by:
- detecting pressing inputs at a surface of the touch screen, the pressing inputs defining a set of beats;
- determining an amount of pressure received from the pressing inputs at the surface of the touch screen;
- translating the pressing inputs to vibratory characteristics of the haptic effect, wherein the vibratory characteristics include a duration and a magnitude of the haptic effect, wherein the magnitude of the haptic effect is based on the amount of pressure that is received from the pressing inputs at the surface of the touch screen;
- displaying the duration of the haptic effect via the GUI on the touch screen;
- storing the vibratory characteristics of the haptic effect on the mobile device; and
- causing the ERM actuator to play the set of beats of the haptic effect when an event associated with the haptic effect occurs, wherein the event is associated with receiving a communication,
- wherein the haptic effect is a vibrotactile haptic effect.

16. The non-transitory computer-readable medium of claim 15, wherein the instructions are configured to cause the processor to detect tapping motions at the mobile device through an accelerometer of the mobile device.

17. The non-transitory computer-readable medium of claim 15, wherein the instructions further cause the processor to display the magnitude of the haptic effect via the GUI on the touch screen.

18. The non-transitory computer-readable medium of claim 15, wherein the one or more vibratory characteristics of the haptic effect further comprise a frequency of the haptic effect.

19. The non-transitory computer-readable medium of claim 15, wherein the instructions are configured to further cause the processor to store a library of haptic tracks that can be used as a starting point for creating haptic effects.

20. The non-transitory computer-readable medium of claim 15, wherein the communication that is associated with the event is an e-mail.

* * * * *

UNITED STATES PATENT AND TRADEMARK OFFICE
CERTIFICATE OF CORRECTION

PATENT NO. : 9,990,038 B2  
APPLICATION NO. : 14/097599  
DATED : June 5, 2018  
INVENTOR(S) : Erin B. Ramsay et al.

Page 1 of 1

It is certified that error appears in the above-identified patent and that said Letters Patent is hereby corrected as shown below:

On the Title Page

Item (*), Notice, Line 3: delete "0 days. days." and replace with --0 days.--.

In the Claims

Column 13, Lines 54-55 (Claim 1): "one or more" should be replaced with --at least one--.

Column 13, Lines 63-64 (Claim 1): "one or more" should be replaced with --at least one--.

Column 14, Line 13 (Claim 4): "one or more" should be replaced with --at least one--.

Column 16, Line 14 (Claim 18): "one or more" should be replaced with --at least one--.

Signed and Sealed this  
Twentieth Day of November, 2018

Andrei Iancu  
*Director of the United States Patent and Trademark Office*